Jan. 10, 1933. C. J. NEHF 1,893,842
FROZEN FOOD PACKET AND PROCESS OF MANUFACTURING THE SAME
Filed Nov. 24, 1931
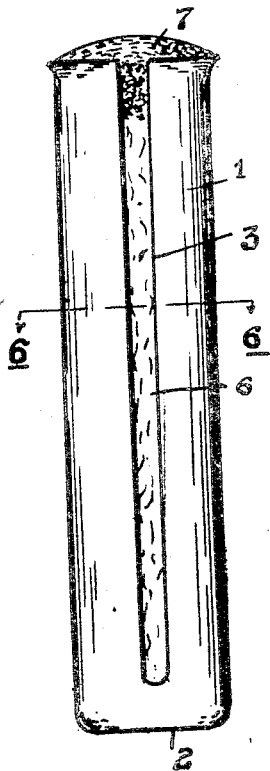
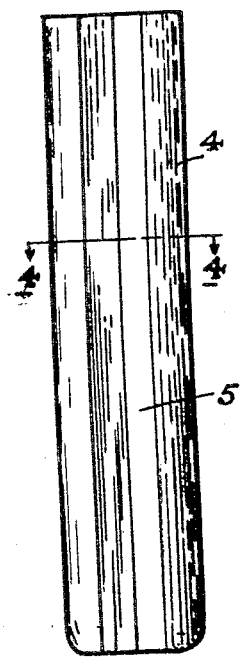
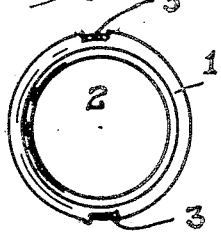
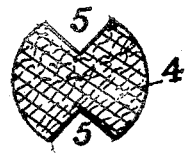
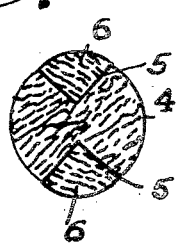
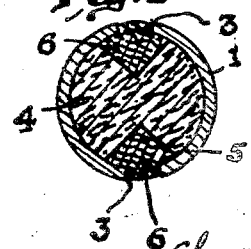
INVENTOR
Charles J. Nehf
by Edward A. Laura
his attorney Patented Jan. 10, 1933

1,893,842

UNITED STATES PATENT OFFICE

CHARLES J. NEHF, OF CASTLE SHANNON, PENNSYLVANIA

FROZEN FOOD PACKET AND PROCESS OF MANUFACTURING THE SAME

Application filed November 24, 1931. Serial No. 576,964.

My improved packet comprises a substantially cylindrical container or "cone" of baked cake batter or like edible material, said container having one end closed and having its side walls provided with longitudinally disposed slots extending from adjacent the closed end to the other or open end of the container, a column of frozen food product such as ice cream inserted into the container and resting on the closed bottom of the same and having longitudinally disposed grooves formed in its sides, which grooves register with the slots in the walls of the container, the edges of said slots preferably overlapping the sides of said grooves, and elongated strips of fruit or other edible material inserted into said grooves and held in position by the overlapping edges of the slots.

Preferably the column of frozen product does not extend to the open end of the container and a quantity of hot chocolate or similar fluid sauce is poured into the unoccupied end of the container, filling the same and flowing down between the walls of the grooves and of the strips and also between the walls of the strips and the overlapping edges of the slots, thus when the sauce is hardened sealing the parts together.

The frozen hardened packet is wrapped in suitable paper and is retailed from a refrigerated receptacle.

In the process of manufacturing my improved packet I first form and bake the container from suitable cake batter or like suitable material, the slots being produced in the forming operation. I then form and insert into the open end of the container a column of ice cream of suitable cross sectional diameter to fit the container snugly, the slotted sides of the container providing sufficient resiliency to hold the column in position. The column has formed in its sides longitudinal grooves which register with the slots in the container and whose vertical edges are overlapped by the edges of said slots, and into these grooves I insert strips of fruit, such as of banana or other edible substance, the strips being held in position by the overlapping edges of the slots.

The column of frozen product is not of sufficient length to completely fill the container and into the open and unoccupied end of the container, the container being held vertically with its open top upwardly, I pour a sufficient quantity of liquid sauce, preferably hot chocolate sauce, to slightly more than fill the top of the container, a portion of said sauce flowing downwardly in the grooves around the strips and between the strips and the wall of the container, thus forming a seal when hardened which holds the parts together.

The packet is then placed in refrigeration until it is thoroughly hardened and the packet is then wrapped in suitable paper and is ready to be delivered under refrigeration to the dispensing shops or other places where it is stored and dispensed at retail out of refrigerated receptacles.

In the accompanying drawing wherein I have illustrated a practical embodiment of the principles of my invention, Fig. 1 is a side elevation of the complete packet with the paper removed.

Fig. 2 is a side elevation of the column of frozen product.

Fig. 3 is a top plan view of the empty container.

Fig. 4 is a cross sectional view of the column of frozen product taken along the line 4—4 in Fig. 2.

Fig. 5 is a like view of the fruit slices in place.

Fig. 6 is a cross sectional view of the completed packet taken along the line 6—6 in Fig. 1.

Referring to the drawing, 1 represents a substantially cylindrical container formed of baked cake batter or other suitable edible material and having its bottom 2 permanently closed. 3 represents the elongated openings or slots in the side wall of the container beginning adjacent to the closed bottom 2 thereof and extending to the other or open end of the container. These slots are preferably two in number and are diametrically opposed to each other.

4 represents a column of frozen product, usually ice cream, formed of suitable cross sectional shape to be inserted down into the container and resting upon the bottom thereof and to fit rather snugly in the container, there being sufficient resiliency in the slotted wall of the container to retain the column in place.

The column is short enough so that it does not extend clear to the top of the container but leaves a relatively shallow unoccupied portion thereof at its open top.

The sides of the column are provided with vertically disposed grooves 5, and when the column is inserted into the container these grooves register with the slots 3 in the wall of the container, the vertical edges of said slots however overlapping the edges of the groove as indicated in Figs. 1 and 6. The grooves are preferably of the triangular cross section shown.

6 represents strips of edible material, preferably of fruit, such as bananas of the proper cross sectional shape to fit in the grooves 5 and these strips are inserted downwardly into the container to occupy said grooves, the overlapping edges of the slots 3 preventing the strips 6 from dropping outwardly.

I then pour into the unoccupied upper end of the container a sufficient quantity of hot chocolate or other suitable liquid sauce to fill the container, which sauce is indicated at 7, some of the sauce flowing down between the walls of the grooves and the strips and also between the strips and the adjacent inner wall surfaces of the container, so that when the sauce becomes hardened the elements of the packet are all sealed together.

The sauce is cooled and hardened and the completed packet is refrigerated until it is frozen hard. It is given a wrapping of suitable paper and is stored in a refrigerated receptacle from which it is delivered to the consumer.

It is evident from the foregoing that my improved frozen food packet is a very attractive article of food, and it has the advantage of being adapted for manufacturing into its completed form in relatively large quantities at a factory so that it may be stored under refrigeration and sold from a refrigerated receptacle to the consumer. It is therefore much more convenient to handle than is the ordinary ice cream cone where the ice cream is loaded into the cone at the time it is delivered to the consumer.

The packet is of an attractive form and shape and may be eaten from the hand without soiling or wetting the fingers.

I claim:—

1. As a new article of manufacture, a frozen food product comprising an elongated cylindraceous container formed of baked edible material and having its lower end closed and its upper end open, a column of frozen product, such as ice cream, fitted in said container, the walls of the container being provided with slotted openings extending longitudinally from the open end and the container resiliently holding the column, the sides of the column being provided with longitudinally disposed grooves which register with the slotted openings but which are wider than said openings so that the side edges of the openings overlap the edges of the grooves, and strips of edible material, such as fruit, inserted in said grooves and held in place by the overlapping edges of the openings.

2. As a new article of manufacture, a frozen food product comprising an elongated cylindraceous container formed of baked edible material and having its lower end closed and its upper end open, a column of frozen product, such as ice cream, fitted in said container, the walls of the container being provided with slotted openings extending longitudinally from the open end and the container resiliently holding the column, the sides of the column being provided with longitudinally disposed grooves which register with the slotted openings but which are wider than said openings so that the side edges of the openings overlap the edges of the grooves, and strips of edible material, such as fruit, inserted in said grooves and held in place by the overlapping edges of the openings, the grooves and strips being of substantially triangular cross sectional shape.

3. As a new article of manufacture, a frozen food product comprising an elongated cylindraceous container formed of baked edible material and having its lower end closed and its upper end open, a column of frozen product, such as ice cream, fitted in said container, the walls of the container being provided with slotted openings extending longitudinally from the open end and the container resiliently holding the column, the sides of the column being provided with longitudinally disposed grooves which register with the slotted openings but which are wider than said openings so that the side edges of the openings overlap the edges of the grooves, and strips of edible material, such as fruit, inserted in said grooves and held in place by the overlapping edges of the openings, the elements being sealed together by hardened sauce, such as chocolate and the like.

4. As a new article of manufacture, a frozen food product comprising an elongated cylindraceous container formed of baked edible material and having its lower end closed and its upper end open, a column of frozen product, such as ice cream, fitted in said container, the walls of the container being provided with slotted openings extending longitudinally from the open end and the container resiliently holding the column, the sides of the column being provided with longitudinally disposed grooves which register with the slotted openings but which are wider than said openings so that the side edges of the openings overlap the edges of the grooves, and strips of edible material, such as fruit, inserted in said grooves and held in place by the overlapping edges of the openings, the open end of the container being sealed with hardened sauce, such as chocolate and the like.

5. The process of assembling a frozen food packet from elements comprising an elongated cylindraceous container formed of baked edible material and having one end closed and longitudinally slotted openings in its side walls extending from its open end, a column of frozen food product, such as ice cream, formed to fit the container and having longitudinally disposed grooves in the side walls and strips of edible material, such as fruit, which consists in inserting the column into the open end of the container with its grooves registering with the slotted openings, and inserting the strips into said grooves, the strips being held in position by the overlapping edges of the slotted openings.

6. The process of assembling a frozen food packet from elements comprising an elongated cylindraceous container formed of baked edible material and having one end closed and longitudinally slotted openings in its side walls extending from its open end, a column of frozen food product, such as ice cream, formed to fit the container and having longitudinally disposed grooves in the side walls and strips of edible material, such as fruit, which consists in inserting the column into the open end of the container with its grooves registering with the slotted openings, inserting the strips into said grooves, the strips being held in position by the overlapping edges of the slotted openings, and sealing the elements together by an application of sauce, such as chocolate and the like, which hardens.

Signed at Pittsburgh, Pa., this 20th day of November, 1931.

CHARLES J. NEHF.